United States Patent
Miyasaka et al.

(12) 
(10) Patent No.: US 12,241,779 B2
(45) Date of Patent: *Mar. 4, 2025

(54) COLORIMETRIC APPARATUS

(71) Applicant: SEIKO EPSON CORPORATION, Tokyo (JP)

(72) Inventors: Haruki Miyasaka, Matsumoto (JP); Kenichi Shirota, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 136 days.

This patent is subject to a terminal disclaimer.

(21) Appl. No.: 18/049,414

(22) Filed: Oct. 25, 2022

(65) Prior Publication Data

US 2023/0131296 A1    Apr. 27, 2023

(30) Foreign Application Priority Data

Oct. 25, 2021 (JP) .................................. 2021-173588

(51) Int. Cl.
*G01J 3/02* (2006.01)
*G01J 3/46* (2006.01)

(52) U.S. Cl.
CPC .......... *G01J 3/0232* (2013.01); *G01J 3/0202* (2013.01); *G01J 3/0291* (2013.01); *G01J 3/46* (2013.01)

(58) Field of Classification Search
CPC ...... G01J 3/0202; G01J 3/0232; G01J 3/0291; G01J 3/46; G01J 2003/1247; G01J 3/0262;

(Continued)

(56) References Cited

U.S. PATENT DOCUMENTS

| 4,916,477 A | 4/1990 | Date |
| 5,327,193 A | 7/1994 | Date et al. |

(Continued)

FOREIGN PATENT DOCUMENTS

| CN | 104049293 A | 9/2014 |
| CN | 209027983 U | 6/2019 |

(Continued)

OTHER PUBLICATIONS

U.S. Appl. No. 17/524,890, filed Nov. 12, 2021, Kenichi Furuya.

(Continued)

*Primary Examiner* — Tri T Ton
(74) *Attorney, Agent, or Firm* — CHIP LAW GROUP

(57) ABSTRACT

A colorimetric apparatus has a shutter unit that can shift between a closed position and an open position. The apparatus body has: a shifting member that can shift between a projection position, at which the shifting member projects in a first direction, and a retraction position, at which the shifting member retracts in a second direction; a first pressing member that presses the shifting member in the first direction; and an operation conversion means that converts the shift operation of the shifting member with respect to the apparatus body to the shift operation of the shutter unit. In a state in which the shifting member is at the projection position, the shutter unit is at the closed position. When the shifting member shifts from the projection position to the retraction position, the shutter unit shifts from the closed position to the open position.

9 Claims, 13 Drawing Sheets

(58) Field of Classification Search
CPC ...... G01J 3/027; G01J 3/26; G01J 3/32; G01J 3/51; A47G 19/2272; A61J 9/005; B65D 25/2885; B65D 47/0842; B65D 47/123; B65D 51/246; Y02W 30/80
See application file for complete search history.

(56) References Cited

U.S. PATENT DOCUMENTS

| | | | |
|---|---|---|---|
| 6,061,140 A | 5/2000 | Berg et al. | |
| 6,431,446 B1 | 8/2002 | Gu et al. | |
| 6,655,778 B2 | 12/2003 | Arquilevich et al. | |
| 6,764,158 B2 | 7/2004 | Arquilevich et al. | |
| 6,905,187 B2 | 6/2005 | Arquilevich et al. | |
| 6,984,013 B2 | 1/2006 | Arqullevich et al. | |
| 7,257,306 B2 | 8/2007 | Sakurai et al. | |
| 8,179,531 B2 | 5/2012 | Villagrasa et al. | |
| 8,876,302 B2 | 11/2014 | Yanagisawa | |
| 10,479,104 B2 | 11/2019 | Oguchi | |
| 10,900,833 B2 | 1/2021 | Gomi | |
| 11,517,219 B2 | 12/2022 | Kaneko et al. | |
| 2005/0184386 A1 | 8/2005 | Suzuki | |
| 2006/0239169 A1 | 10/2006 | Marumo et al. | |
| 2007/0081156 A1 | 4/2007 | Treado et al. | |
| 2010/0053558 A1 | 3/2010 | Yanagisawa | |
| 2010/0085434 A1 | 4/2010 | Stewart | |
| 2010/0328656 A1* | 12/2010 | Frick ............... | G01J 3/0272 356/247 |
| 2010/0328667 A1 | 12/2010 | Wegmuller et al. | |
| 2013/0215182 A1 | 8/2013 | Yatsunami | |
| 2014/0043590 A1 | 2/2014 | Ozawa | |
| 2014/0091211 A1 | 4/2014 | Kitahara | |
| 2014/0152990 A1 | 6/2014 | Ehbets et al. | |
| 2014/0268204 A1 | 9/2014 | Sasaki et al. | |
| 2014/0268342 A1 | 9/2014 | Matsushita | |
| 2015/0085279 A1 | 3/2015 | Balooch et al. | |
| 2015/0239251 A1 | 8/2015 | Taniguchi et al. | |
| 2016/0057330 A1 | 2/2016 | Zhao et al. | |
| 2016/0242683 A1 | 8/2016 | Ishiguro et al. | |
| 2017/0126933 A1 | 5/2017 | Kanai | |
| 2017/0334220 A1 | 11/2017 | Tatsuda | |
| 2018/0157018 A1 | 6/2018 | Miller | |
| 2019/0023023 A1 | 1/2019 | Oguchi | |
| 2019/0162594 A1 | 5/2019 | Gomi | |
| 2019/0186997 A1 | 6/2019 | Nakai et al. | |
| 2019/0298225 A1 | 10/2019 | Kaneko et al. | |
| 2020/0300705 A1 | 9/2020 | Saiki | |
| 2022/0146307 A1 | 5/2022 | Miyasaka et al. | |
| 2022/0146314 A1 | 5/2022 | Miyasaka et al. | |
| 2022/0146315 A1 | 5/2022 | Furuya et al. | |
| 2022/0146316 A1 | 5/2022 | Miyasaka et al. | |
| 2022/0146317 A1 | 5/2022 | Miyasaka et al. | |
| 2022/0146318 A1 | 5/2022 | Furuya et al. | |
| 2022/0283033 A1* | 9/2022 | Miyake ............... | G01D 5/14 |
| 2023/0131296 A1 | 4/2023 | Miyasaka et al. | |

FOREIGN PATENT DOCUMENTS

| | | |
|---|---|---|
| CN | 110018127 A | 7/2019 |
| CN | 209927292 U | 1/2020 |
| JP | S5633516 U | 4/1981 |
| JP | H01263626 A | 10/1989 |
| JP | H05215677 A | 8/1993 |
| JP | H11227176 A | 8/1999 |
| JP | 2001210202 A | 8/2001 |
| JP | 2002127521 A | 5/2002 |
| JP | 2003179252 A | 6/2003 |
| JP | 2003229996 A | 8/2003 |
| JP | 2003260829 A | 9/2003 |
| JP | 2005236183 A | 9/2005 |
| JP | 2006302415 A | 11/2006 |
| JP | 2007114038 A | 5/2007 |
| JP | 2010079253 A | 4/2010 |
| JP | 2010194748 A | 9/2010 |
| JP | 2010221603 A | 10/2010 |
| JP | 2011229046 A | 11/2011 |
| JP | 2012020423 A | 2/2012 |
| JP | 2012058862 A | 3/2012 |
| JP | 2012215756 A | 11/2012 |
| JP | 2012217210 A | 11/2012 |
| JP | 2013088519 A | 5/2013 |
| JP | 3185875 U | 9/2013 |
| JP | 2013205258 A | 10/2013 |
| JP | 2014202883 A | 10/2014 |
| JP | 2016154648 A | 9/2016 |
| JP | 2017110926 A | 6/2017 |
| JP | 2018025495 A | 2/2018 |
| JP | 2019020254 A | 2/2019 |
| JP | 2019113494 A | 7/2019 |
| JP | 2019170541 A | 10/2019 |
| WO | 2007078505 A2 | 7/2007 |
| WO | 2017195573 A1 | 11/2017 |
| WO | 2019235054 A1 | 12/2019 |

OTHER PUBLICATIONS

U.S. Appl. No. 17/524,945, filed Nov. 12, 2021, Kenichi Furuya.
Office Action for JP Patent Application No. JP2021034466, issued on Nov. 26, 2024, 4 pages.
Office Action for JP Patent Application No. 2020188447, issued on Jan. 7, 2025, 9 pages.

* cited by examiner

COLORIMETRIC APPARATUS

The present application is based on, and claims priority from JP Application Serial Number 2021-173588, filed Oct. 25, 2021, the disclosure of which is hereby incorporated by reference herein in its entirety.

BACKGROUND

1. Technical Field

The present disclosure relates to a colorimetric apparatus that performs colorimetry on the basis of light received from an object under measurement.

2. Related Art

A colorimetric apparatus known in related art performs colorimetry on the basis of light received from an object under measurement. In a type of colorimetric apparatus, to perform colorimetry, light received from an object under measurement is incident on a spectroscopic filter, after which light with a predetermined wavelength is extracted through the spectroscopic filter and is received by a photodiode, and a voltage output from the photodiode is detected, for example. This type of colorimetric apparatus has an opening formed in the bottom surface of the apparatus body. When this opening is left open, dust or the like enters the interior of the colorimetric apparatus. In view of this, a shutter member may be provided that is switchable between a state in which the opening is covered and a state in which the opening is exposed, as described in the description in U.S. Patent Application Publication No. 2010/0328656.

In the description in U.S. Patent Application Publication No. 2010/0328656, the shutter member that covers the opening is referred to as the support plate. The support plate is provided so as to be movable between a position at which the support plate covers a measurement window, which is the opening, and a position at which the measurement window is exposed. The support plate has a white reference tile. In the state in which the support plate covers the measurement window, a white reference value can be obtained.

A depression is formed in the support plate described in the description in U.S. Patent Application Publication No. 2010/0328656 so that the user places a finger in this depression and slides the support plate. This complicates the user's manipulation to perform a colorimetric manipulation. From the viewpoint of usability, there is room for improvement.

SUMMARY

To address the above problem, a colorimetric apparatus in the present disclosure has: an apparatus body; an opening forming member in which an opening through which light received from an object under measurement is taken into the interior of the apparatus body is formed, the opening forming member being disposed at the bottom of the apparatus body; an incident light processor that processes light incident through the opening; and a shutter unit that can shift between a closed position, at which the shutter unit covers the opening, and an open position, at which the shutter unit opens the opening, colorimetry being performed with the shutter unit at the open position. The apparatus body has: a shifting member that can shift between a projection position, at which the shifting member projects the most in a first direction in which the shifting member projects from the bottom, and a retraction position, at which the shifting member retracts the most in a second direction opposite to the first direction; a first pressing member that presses the shifting member in the first direction; and an operation conversion means that converts the shift operation of the shifting member with respect to the apparatus body to the shift operation of the shutter unit. In a state in which the shifting member is at the projection position, the shutter unit is at the closed position. When the shifting member shifts from the projection position to the retraction position, the shutter unit is shifted from the closed position to the open position by the operation conversion means.

BRIEF DESCRIPTION OF THE DRAWINGS

FIG. 10A is a sectional view of a case, the opening forming member, and the shifting member, and FIG. 10B is a sectional view of the case and shifting member.

FIG. 11A is a sectional view of the case, opening forming member, and shifting member, and FIG. 11B is a sectional view of the case and shifting member.

FIG. 12A is a sectional view of the case, opening forming member, and shifting member, and FIG. 12B is a sectional view of the case and shifting member.

DESCRIPTION OF EXEMPLARY EMBODIMENTS

Figure 1:
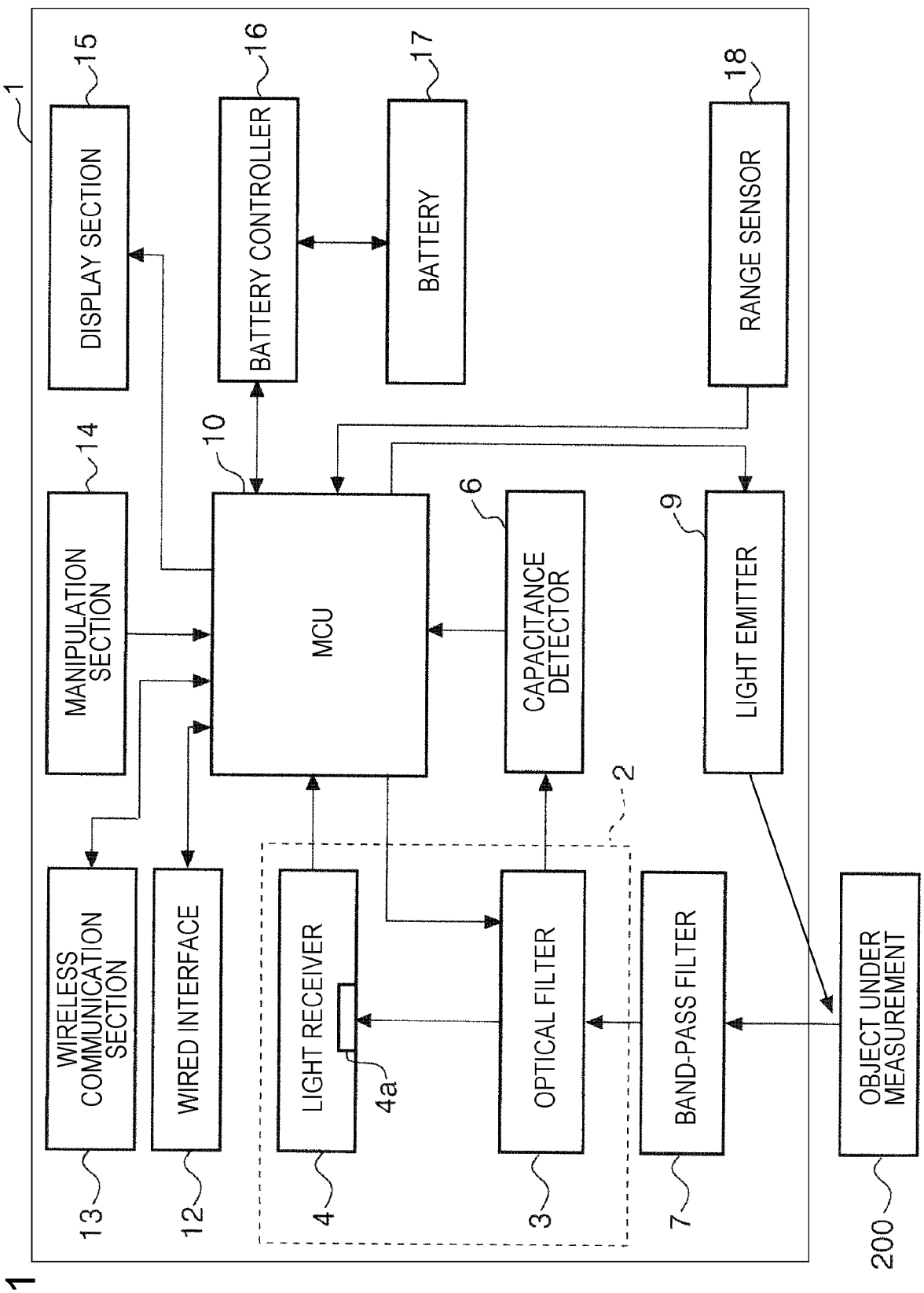
FIG. 1 is a functional block diagram of a colorimetric apparatus.

A general description of the present disclosure will be given below.

A colorimetric apparatus in a first aspect has: an apparatus body; an opening forming member in which an opening through which light received from an object under measurement is taken into the interior of the apparatus body is formed, the opening forming member being disposed at the bottom of the apparatus body; an incident light processor that processes light incident through the opening; and a shutter unit that can shift between a closed position, at which the shutter unit covers the opening, and an open position, at which the shutter unit opens the opening, colorimetry being performed with the shutter unit at the open position. The apparatus body has: a shifting member that can shift between a projection position, at which the shifting member projects the most in a first direction in which the shifting member projects from the bottom, and a retraction position, at which the shifting member retracts the most in a second direction opposite to the first direction; a first pressing member that presses the shifting member in the first direction; and an operation conversion means that converts the shift operation of the shifting member with respect to the apparatus body to the shift operation of the shutter unit. In a state in which the shifting member is at the projection position, the shutter unit is at the closed position. When the shifting member shifts from the projection position to the retraction position, the shutter unit is shifted from the closed position to the open position by the operation conversion means.

In this aspect, since the shifting member and the operation conversion means are provided, when the apparatus body is pressed toward the object under measurement, the shifting member shifts from the projection position to the retraction position with respect to the apparatus body. Then, the shutter unit shifts from the closed position to the open position. In this structure, the user's manipulation to perform colorimetry is simplified, so the usability of the colorimetric apparatus can be improved.

In a second aspect, the colorimetric apparatus in the first aspect has a case that forms the side surfaces of the apparatus body and the shifting member is shaped along the inner surfaces of the case so as to enclose the opening forming member.

In this aspect, since the shifting member is shaped along the inner surfaces of the case so as to enclose the opening forming member, when the apparatus body is mounted on a mounting surface with the bottom facing down, the attitude of the apparatus body is stabilized. This makes it hard for the apparatus body to fall to the mounting surface.

In a third aspect, the shifting member in the second aspect has a wall that covers part of the opening forming member and also has a window, through which the opening is exposed.

In this aspect, since the shifting member has a wall that covers part of the opening forming member and also has a window, through which the opening is exposed, the wall can restrain dust from entering the interior of the colorimetric apparatus.

In a fourth aspect, the operation conversion means in the second or third aspect has guided axes disposed in the shutter unit, first guide grooves formed in the opening forming member, and second guide grooves formed in the shifting member. Each guided axis projects in a direction crossing a direction in which the shutter unit shifts. Each first guide groove, into which the relevant guided axis fits, guides the shutter unit between the closed position and the open position. Each second guide groove, into which the relevant guided axis fits, extends in a direction crossing a direction in which the shifting member shifts, the second guide groove moving the guided axis in the first guide groove along with a shift with respect to the apparatus body.

In this aspect, since the operation conversion means is structured so that, to shift the shutter unit, the second guide grooves move the guided axes in the first guide grooves, the operation conversion means can be implemented with a few number of parts.

In a fifth aspect, the shifting member in any one of the second to fourth aspects is formed from a transparent material so that the object under measurement can be viewed from the outside in a state in which the opening faces the object under measurement.

In this aspect, since the shifting member is formed from a transparent material so that the object under measurement can be viewed from the outside in a state in which the opening faces the object under measurement, the alignment of the colorimetry portion is eased and the usability of the colorimetric apparatus is thereby improved.

In a sixth embodiment, the shutter unit in any one of the first to fifth aspects has: a shutter member that closes the opening when the shutter unit is at the closed position; a shutter holding member that holds the shutter member so that the shutter member can be shifted in a direction toward the opening and in a direction away from the opening; and a second pressing member that presses the shutter member toward the opening.

In this aspect, due to a structure in which the shutter member is pressed by the second pressing member toward the opening, even when error occurs in the manufacturing of parts or the assembling of parts or even when wear or the like is caused by use, the occurrence of a clearance can be suppressed between the shutter member and the opening forming member because the shutter member is pressed toward the opening. As a result, it is possible to satisfactorily suppress the entrance of dust or the like into the opening.

In a seventh aspect, the colorimetric apparatus in any one of the first to sixth aspects has: a reflection reference surface provided at a position, in the shutter unit, at which the reflection reference surface faces the opening; a detector that detects information about the position of the shifting member; and a controller that can execute reference value acquiring processing in which a reflection reference value is acquired by using the reflection reference surface. The controller executes the reference value acquiring processing when the controller detects, from detection information obtained from the detector, a shift of the shifting member from the projection position toward the retraction position.

In this aspect, since the controller executes reference value acquiring processing when the controller detects, from detection information obtained from the detector, a shift of the shifting member from the projection position toward the retraction position, the user itself does not need to command execution of the reference value acquiring processing. This improves the usability of the colorimetric apparatus.

In an eighth aspect, the controller in the seventh aspect executes colorimetry processing when the controller detects, from the detection information obtained from the detector, that the shifting member has moved to the retraction position.

In this aspect, since the controller executes colorimetry processing when the controller detects, from detection information obtained from the detector, that the shifting member has moved to the retraction position, the user itself does not need to command execution of the colorimetry processing. This improves the usability of the colorimetric apparatus.

In a ninth aspect, the colorimetric apparatus in any one of the first to sixth aspects has a detector that detects information about the position of the shifting member. The controller responsible for execution of colorimetry processing executes the colorimetry processing when the controller detects, from detection information obtained from the detector, that the shifting member has moved to the retraction position.

In this aspect, since controller executes colorimetry processing when the controller detects, from detection information obtained from the detector, that the shifting member has moved to the retraction position, the user itself does not need to command execution of the colorimetry processing. This improves the usability of the colorimetric apparatus.

The present disclosure will be specifically described below.

The X-Y-Z coordinate system in the drawings is an orthogonal coordinate system, in which an X-Y plane is a horizontal plane and an X-plane and a Y-Z plane are a vertical plane.

The Z-axis direction is the vertical direction. The −Z direction is a first direction in which a shifting member 60, which will be described later, projects from an apparatus body 50. The +Z direction is a second direction opposite to the first direction. The Z-axis direction is a direction parallel to an optical axis CL, which will be described later.

The Y-axis direction is the long-side direction of a colorimetric apparatus 1 when it is viewed from the Z-axis direction. The X-axis direction, which is orthogonal to the Y-axis direction, is the short-side direction of the colorimetric apparatus 1 when it is viewed from the Z-axis direction.

In this description, it will be assumed that the colorimetric apparatus 1 is structured so that the colorimetric apparatus 1 is mounted on a mounting surface parallel to a horizontal plane and that the long-side direction of the colorimetric apparatus 1 is along the Y-axis direction.

Figure 2:
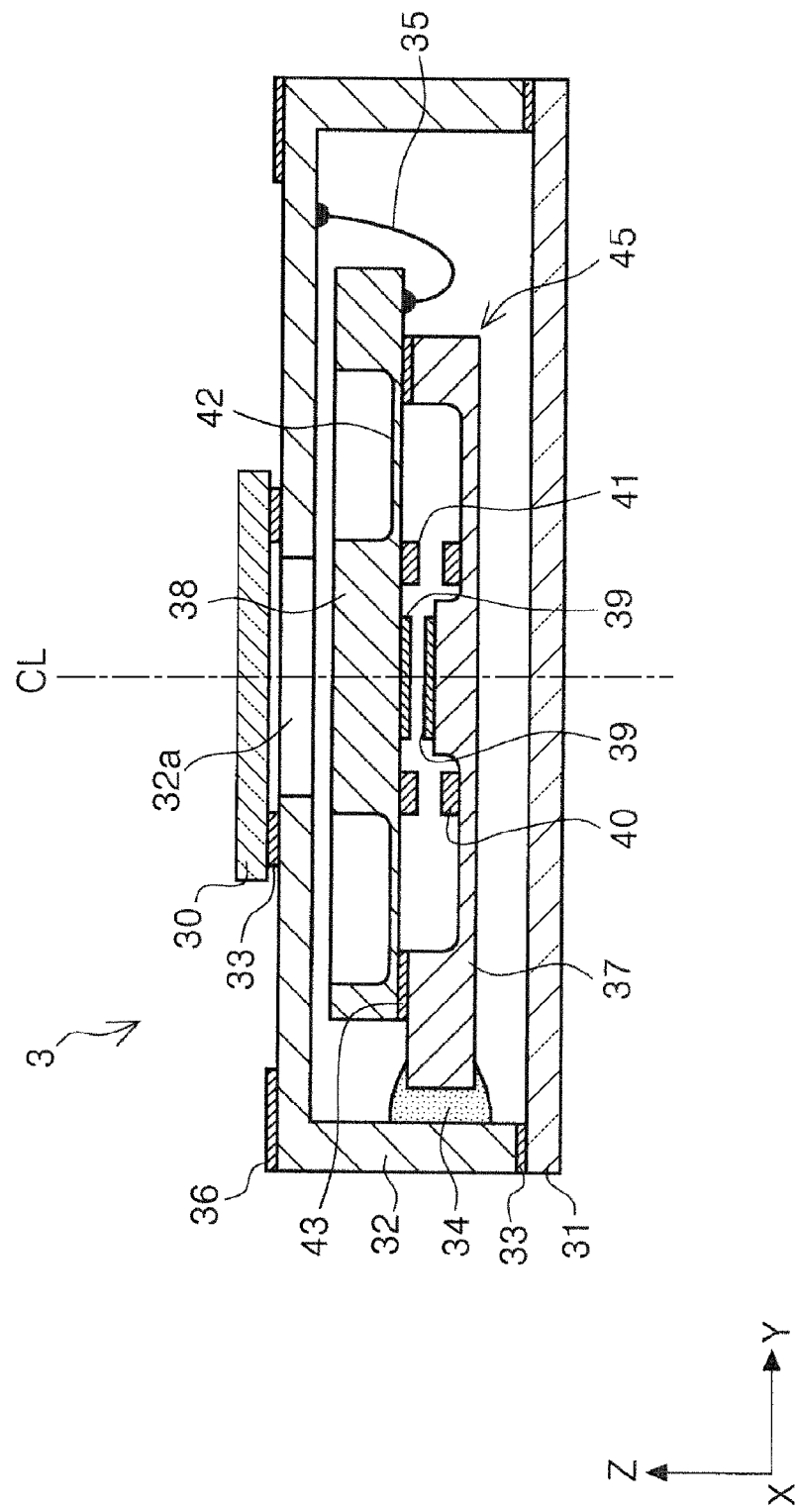
FIG. 2 is a sectional view of an optical filter.

First, the entire structure of the colorimetric apparatus 1 in an embodiment will be generally described mainly from the functional viewpoint, with reference to FIGS. 1 and 2.

The colorimetric apparatus 1 has a structure to perform colorimetry on the basis of light received from an object 200 under measurement. Light received from the object 200 under measurement include light reflected from the object 200 under measurement and light emitted by the object 200 itself under measurement.

The colorimetric apparatus 1 has a band-pass filter 7, an optical filter 3, a light receiver 4, a capacitance detector 6, a light emitter 9, a microcontroller unit (MCU) 10, a wired interface 12, a wireless communication section 13, a manipulation section 14, a display section 15, a battery controller 16, and a battery 17.

The optical filter 3 and light receiver 4 constitute an incident light processor 2 that processes incident light from the object 200 under measurement.

The band-pass filter 7 transmits light in a visible light range, for example, light with a wavelength of 380 to 720 nm, of the light received from the object 200 under measurement, and cuts light in an ultraviolet light range and an infrared light range. Thus, light in the visible light range enters the optical filter 3. Light that has arrived at the band-pass filter 7 from the object 200 under measurement enters the interior of the colorimetric apparatus 1 through an opening 21a (see FIG. 6), which will be described later, passes through a measurement window 87a (see FIG. 6), and arrives at the band-pass filter 7.

The optical filter 3 selectively transmits light with a desired wavelength, which is part of the visible light that has passed through the band-pass filter 7. The light that has transmitted through the optical filter 3 enters a photodiode 4a, which is an example of a light-receiving element, after which the light is processed in the light receiver 4, in which the photodiode 4a is disposed. The light receiver 4 converts the strength of the received light to a voltage value, further converts the voltage value to a digital signal, and outputs the digital signal to the MCU 10. The colorimetric apparatus 1 can measure the spectrum of the object 200 under measurement by repeatedly performing wavelength selection by using the optical filter 3 and the acquisition of the strength of the received light by using the light receiver 4.

Now, the structure of the optical filter 3 will be described with reference to FIG. 2. The optical filter 3 in this embodiment is a tunable Fabry-Perot etalon that transmits light with a predetermined wavelength, the light being part of incident light from the object 200 under measurement, and is a wavelength filter that uses multiple interferences on two opposing reflecting surfaces.

In FIG. 2, the optical filter 3 has a tunable interference filter 45. The tunable interference filter 45 is incorporated into an external body composed of a first glass member 30, a second glass member 31, and a case 32.

The case 32 and first glass member 30 are joined together with a joining member 33 formed from low-melting glass, an epoxy resin, or the like. The case 32 and second glass member 31 are also joined together in the same way. The tunable interference filter 45 and case 32 are fixed together with a fixing material 34 such as an adhesive. A wire bonding 35 and wiring in the case 32 create a continuity between the tunable interference filter 45 and an electrode 36 on an outer surface of the case 32.

The tunable interference filter 45 has a base substrate 37 and a diaphragm substrate 38. The base substrate 37 and diaphragm substrate 38 are joined together with a bonding film 43. A mirror 39 is formed on each of the base substrate 37 and diaphragm substrate 38 in the form of a film. The outermost surfaces of the mirrors 39, which face each other, are formed from a conductor. A capacitance between the face-to-face mirrors 39 is detected by the capacitance detector 6 (see FIG. 1). The capacitance detector 6, which is composed of a capacitance-to-voltage (CV) converter, converts the detected capacitance to a voltage value, further converts the voltage value to a digital value, and outputs the digital value to the MCU 10.

The distance between the face-to-face mirrors 39 is controlled by a capacitive actuator composed of a fixed electrode 40 and a movable electrode 41, which are placed so as to face each other and be concentric when viewed from the Z-axis direction.

When a voltage is applied across the fixed electrode 40 and movable electrode 41, which face each other, a force with which the fixed electrode 40 and movable electrode 41 attract each other is generated due to an electrostatic force. At this time, since a diaphragm section 42, which is formed so as to be concentric, is deformed, the mirror 39 on the diaphragm substrate 38 is attracted toward the base substrate 37, controlling the distance between the face-to-face mirrors 39. The wavelength of the light that passes through the tunable interference filter 45 is selected according to the distance between the face-to-face mirrors 39.

During spectroscopic measurement, light from the object 200 under measurement is incident on the optical filter 3 along an optical axis CL, from the second glass member 31 toward the first glass member 30. The optical axis CL is parallel to the Z-axis direction and passes the centers of the opening 21a (see FIG. 6), measurement window 87a (see FIG. 6), tunable interference filter 45, and photodiode 4a. Particularly, the opening 21a, measurement window 87a, and tunable interference filter 45 are each in a perfect circular shape when viewed from the Z-axis direction. The optical axis CL passes their centers. In the description below, the optical axis CL will also be referred to as the center position CL.

The light incident on the optical filter 3 causes interference between the face-to-face mirrors 39, after which light with the wavelength selected according to the distance between the face-to-face mirrors 39 passes through the tunable interference filter 45. After having passed through the tunable interference filter 45, the light propagates through an opening 32a in the case 32, passes through the first glass member 30, and travels toward the light receiver 4. The opening 32a in the case 32 is in a perfect circular shape centered around the optical axis CL.

This completes the description of the structure of the optical filter 3.

Referring again to FIG. 1, the MCU 10, which is a controller based on a microprocessor, incorporates various programs and various data that are needed to control the colorimetric apparatus 1.

The MCU 10 sends, to an amplifier (not illustrated), control information needed to drive the capacitive actuator composed of the fixed electrode 40 and movable electrode 41, which face each other, as described with reference to FIG. 2. The MCU 10 then supplies a predetermined driving voltage from this amplifier to the optical filter 3. The MCU 10 compares information about the voltage value output from the capacitance detector 6 with a stored value, and performs feedback control for the optical filter 3 according to the comparison result.

The light emitter 9 emits light for use in measurement toward the object 200 under measurement. The light emitter 9 is composed of a plurality of light-emitting elements having different wavelength distributions in emitted light, specifically, a plurality of light-emitting diodes (LEDs). The MCU 10 controls the turning-on and turning-off of the light emitter 9.

The wired interface 12 and wireless communication section 13 are each a constituent element used for communication with external devices. Universal Serial Bus (USB) can be used as an example of a standard for communication through the wired interface 12. Bluetooth can be used as an example of a standard for the wireless communication section 13. USB and Bluetooth are a registered trademark. Through the wired interface 12 or wireless communication section 13, the MCU 10 sends various data to external devices or receives various data from external devices. The colorimetric apparatus 1 can also receive electric power supplied from an external device through the wired interface 12 to charge the battery 17.

The manipulation section 14 includes a power button and various other manipulation setting buttons. The manipulation section 14 sends a signal to the MCU 10 according to the manipulation. The manipulation section 14 will be further described later.

The display section 15 is composed of a liquid crystal panel as an example. The display section 15 displays various types of information, such as colorimetry results and user interfaces used to set colorimetry conditions, according to signals sent from the MCU 10.

A range sensor 18, which sends a detection signal to the MCU 10, detects the position of the shifting member 60 in the Z-axis direction, the position being relative to the apparatus body 50. The shifting member 60 will be described later.

The battery 17 in this embodiment is a lithium-ion secondary battery. The battery 17 supplies electric power to constituent portions, in the colorimetric apparatus 1, that need electric power. The constituent portions that need electric power supplied from the battery 17 include an incident light processor 2, which will be described later. The battery controller 16 performs control under which the battery 17 is charged and various other types of control.

Next, the structure of the appearance of the colorimetric apparatus 1 will be described with reference to FIG. 3 and later drawings, focusing on the shifting member 60 and a shutter unit 70.

The apparatus body 50 of the colorimetric apparatus 1 is structured so that a main case 51 forms a box shape as a whole. The main case 51 forms the side surfaces of the apparatus body 50, that is, the front surface, rear surface, right-side surface, and left-side surface. In the relevant drawings, the reference characters 50d refer to the side surface of the apparatus body 50 in the −Y direction, that is, the rear surface. In colorimetry, the user of the colorimetric apparatus 1 holds the apparatus body 50 with the rear surface 50d facing the user. In view of this, the size of the apparatus body 50, particularly its size in the X-axis direction, is enough for the user to hold the apparatus body 50 with one hand.

The manipulation section 14 and display section 15 are disposed on the top surface 50e of the apparatus body 50 along the Y-axis direction.

The user can perform various setting manipulations through buttons disposed on the manipulation section 14. Colorimetry results and various other types of information are displayed on the display section 15.

The shifting member 60 is disposed at the button of the apparatus body 50. In this embodiment, the bottom surface 51b of the main case 51 is the bottom surface of the apparatus body 50. The bottom of the apparatus body 50 is equivalent to the bottom surface 51b of the main case 51.

The shifting member 60 is shaped along the inner surfaces 51a of the main case 51 so as to enclose an opening forming member 21. Therefore, when the apparatus body 50 is mounted on the mounting surface with the bottom surface 51b facing down, the attitude of the apparatus body 50 is stabilized, making it hard for the apparatus body 50 to fall to the mounting surface.

The shifting member 60 has a wall 60f that covers part of the opening forming member 21 and also has a window 60e, through which the opening 21a is exposed. The wall 60f can restrain dust from entering the interior of the colorimetric apparatus 1.

Figure 4:
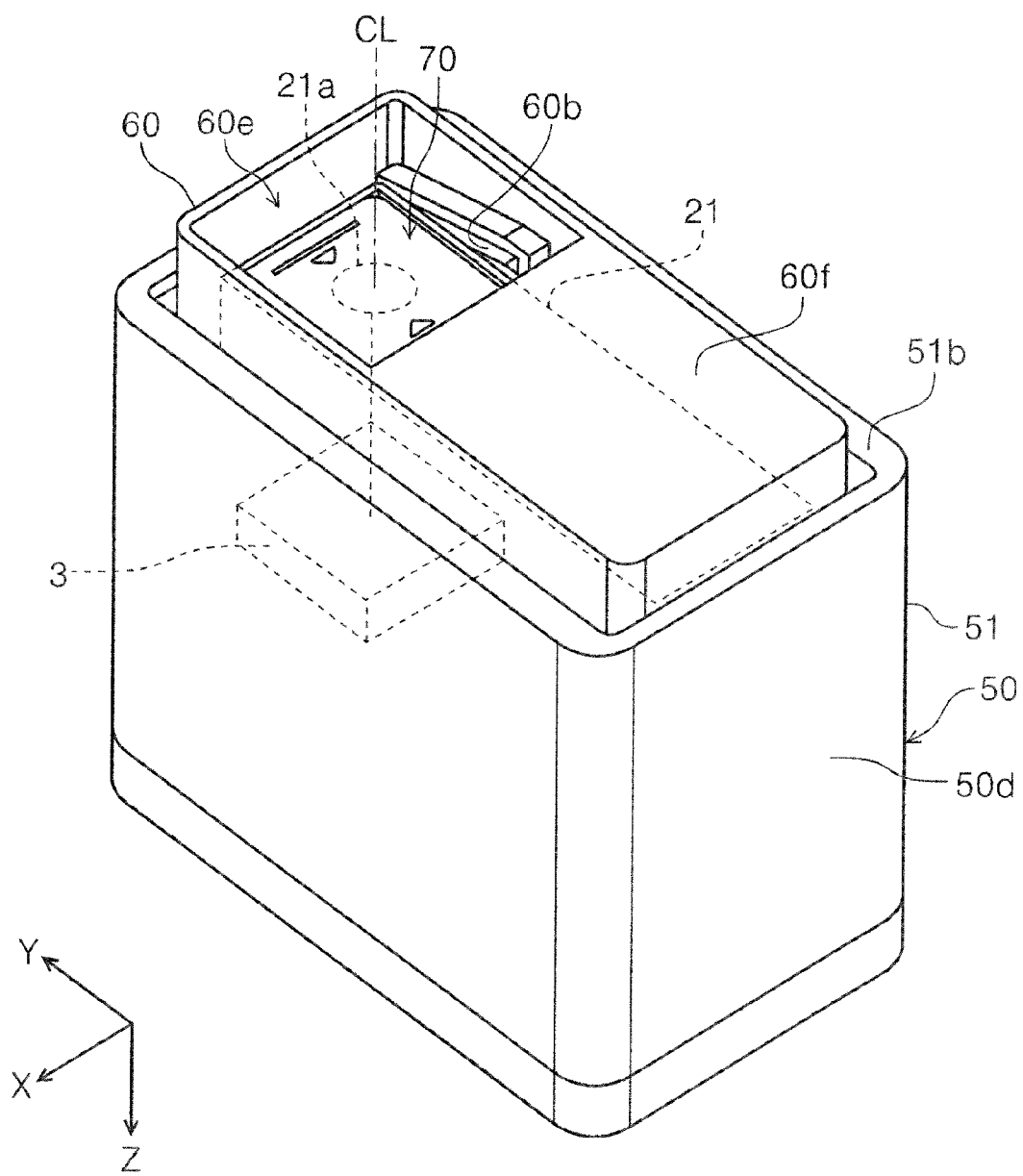
FIG. 4 is a perspective view of the colorimetric apparatus when viewed from below; a shifting member is at a projection position and a shutter unit is at a closed position.

The shutter unit 70 is provided inside the shifting member 60. When sliding along the Y-axis direction, the shutter unit 70 can shift between a closed position (see FIGS. 4 and 5), at which the shutter unit 70 closes the opening 21a, and an open position (see FIG. 6), at which the shutter unit 70 opens the opening 21a.

Figure 5:
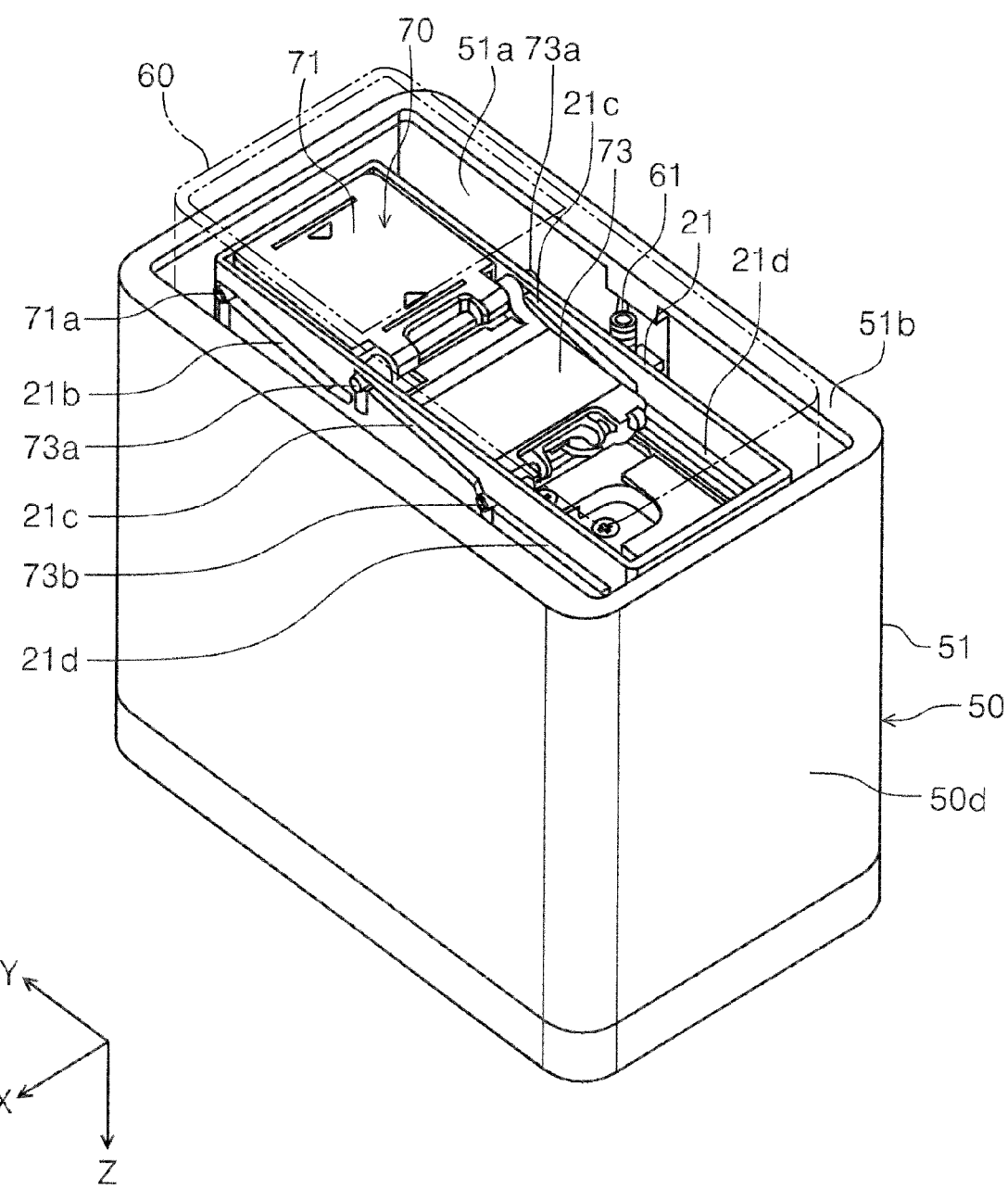
FIG. 5 is a perspective view of the colorimetric apparatus when viewed from below; the shutter unit is at the closed position with the shifting member removed.
Figure 6:
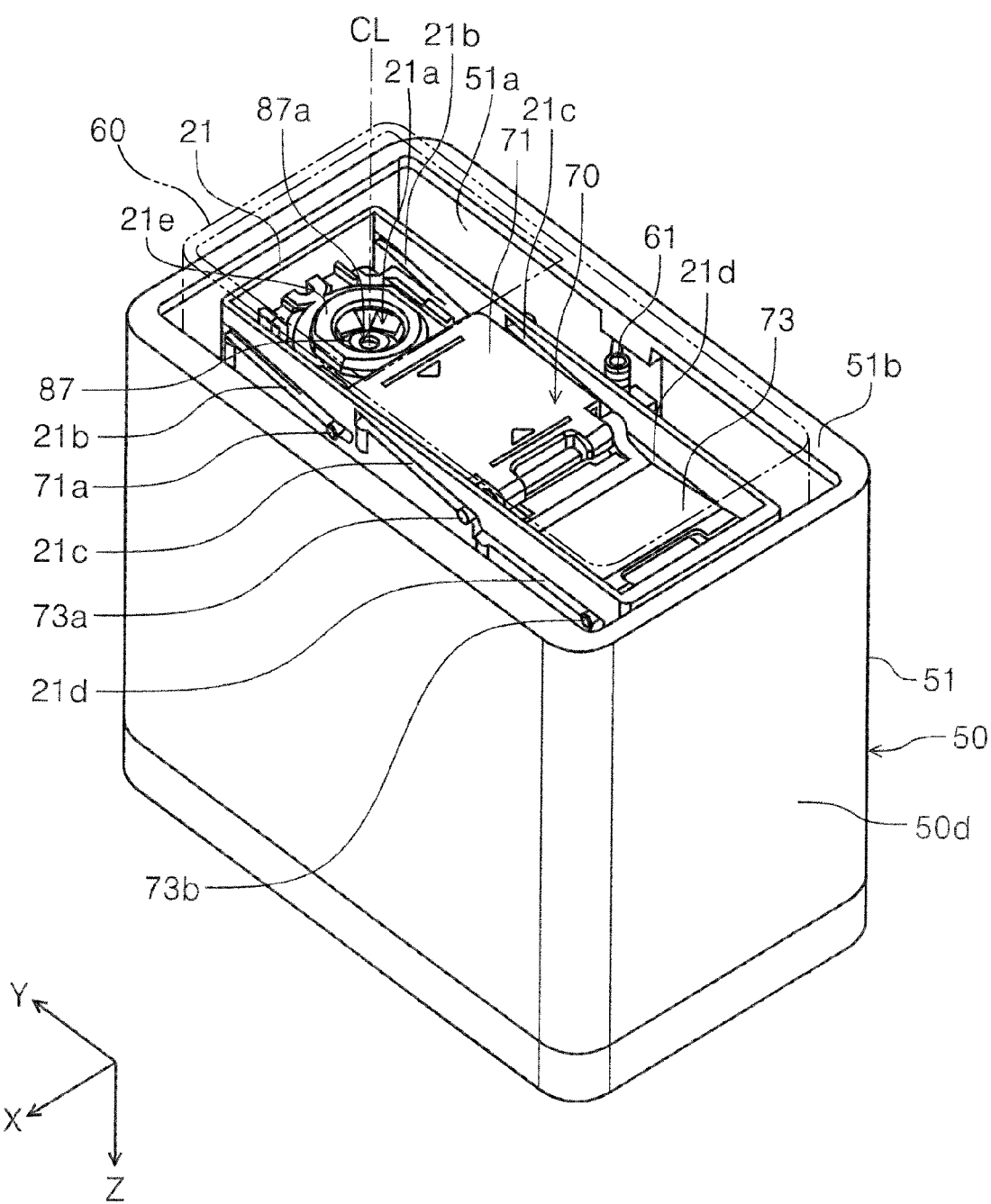
FIG. 6 is a perspective view of the colorimetric apparatus when viewed from below; the shutter unit is at an open position with the shifting member removed.

When the shutter unit 70 is opened in the state in FIG. 5, the opening 21a and measurement window 87a are exposed as illustrated in FIG. 6. The opening 21a and measurement window 87a are open in the −Z direction. The opening 21a and measurement window 87a each form a perfect circle in plan view.

The opening 21a is formed in the opening forming member 21 disposed at the bottom of the colorimetric apparatus 1. The measurement window 87a is formed in a focusing member 87 positioned in the +Z direction of the opening forming member 21. The opening forming member 21 is shaped so as to extend across the whole of the bottom of the colorimetric apparatus 1.

Measurement light emitted from the light emitter 9 (see FIG. 1) is directed from the opening 21a toward the object 200 under measurement. The light received from the object 200 under measurement is taken into the interior of the colorimetric apparatus 1 through the opening 21a. The light further passes through the measurement window 87a and enters the band-pass filter 7 (see FIG. 1).

The optical axis CL matches the central axis lines of the opening 21a and measurement window 87a.

Figure 7:
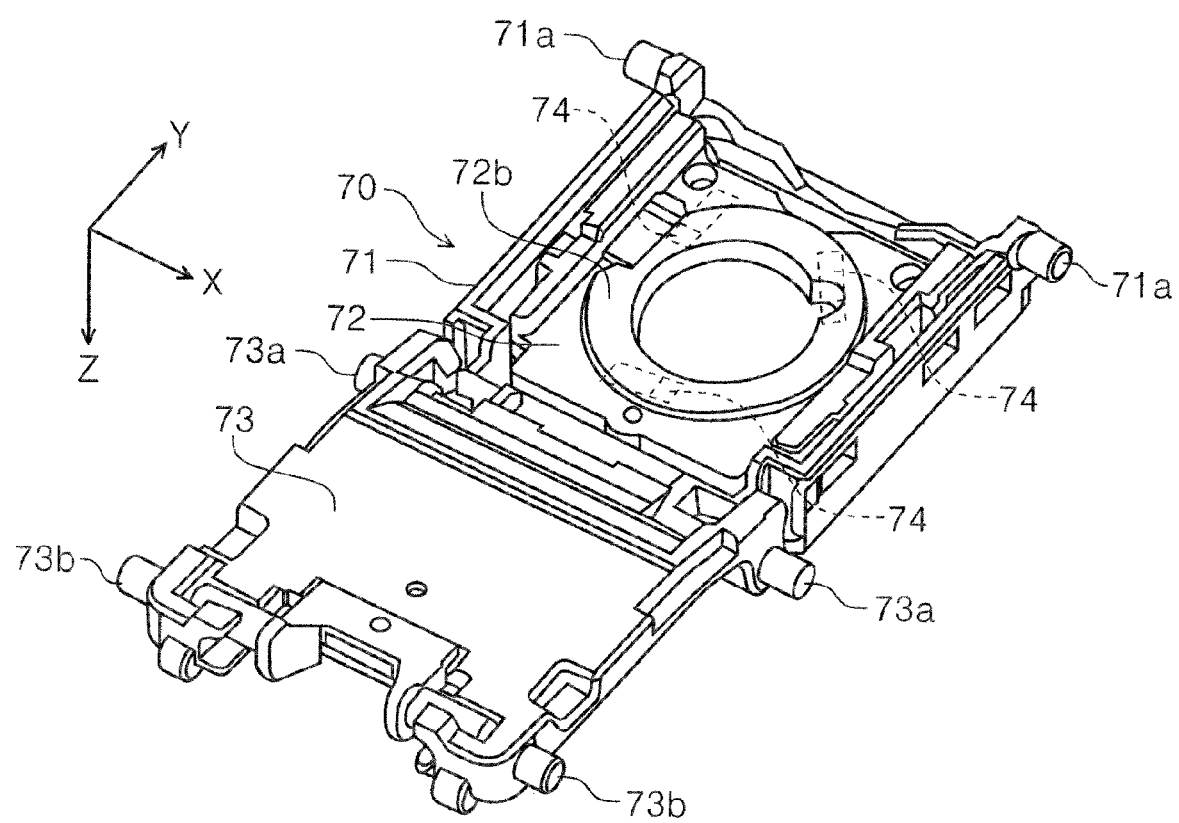
FIG. 7 is a perspective view of the shutter unit when viewed from above.

The shutter unit 70 that opens and closes the opening 21a is composed of a shutter holding member 71, a shutter member 72, and a link member 73 as illustrated in FIG. 7. The shutter member 72 closes the opening 21a when the shutter unit 70 is at the closed position. The shutter member 72 is held by the shutter holding member 71. The shutter member 72 is held so that it can be displaced by a predetermined amount in the Z axis with respect to the shutter holding member 71. The shutter member 72 is also pressed by a leaf spring 74, which is an example of a second pressing member, toward the opening 21a.

Thus, even when error occurs in the manufacturing of parts or the assembling of parts or even when wear or the like is caused by use, the occurrence of a clearance can be suppressed between the shutter member 72 and the opening forming member 21 because the shutter member 72 is pressed toward the opening 21a. This can satisfactorily suppress the entrance of dust or the like into the opening 21a.

A closing portion 72b in a ring shape is formed in the shutter member 72. When the closing portion 72b is pressed against a closed portion 21e (see FIG. 9) formed in the opening forming member 21, the opening 21a is closed.

A white plate, which is used as a reflection reference surface, is provided inside the closing portion 72b. To acquire a reflection reference value, the white plate is colored in white so that it has reflectance close to 100%.

The white plate is circular, the central position of which substantially matches the optical axis CL.

The shutter holding member 71 and link member 73 are linked together by a linkage axis (not illustrated). The shutter holding member 71 and link member 73, which are combined into one member, shift between the closed position and the open position. In the +Y direction, the shutter holding member 71 has forward guided axes 71a at both ends in the X-axis direction so as to project in the X-axis direction.

Also in the +Y direction, the link member 73 has intermediate guided axes 73a at both ends in the X-axis direction so as to project in the X-axis direction. In the −Y direction, the link member 73 has backward guided axes 73b at both ends in the X-axis direction so as to project in the X-axis direction.

Figure 9:
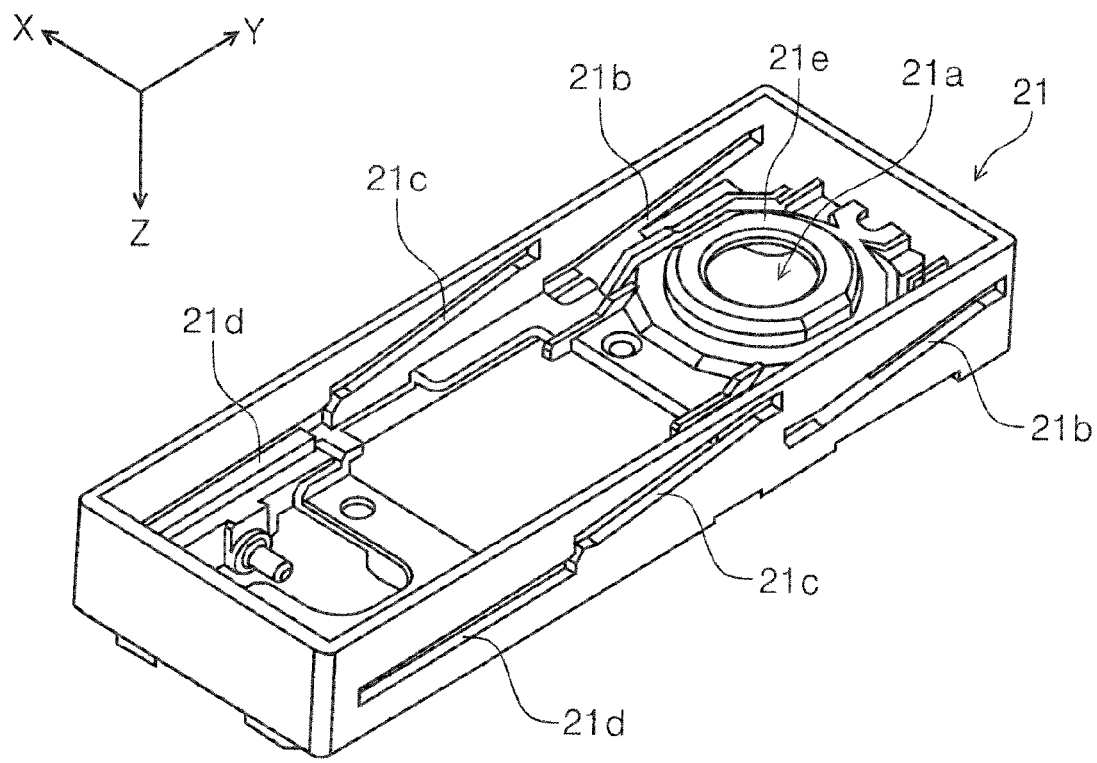
FIG. 9 is a perspective view of an opening forming member when viewed from below.

In the opening forming member 21, forward first guide grooves 21b, intermediate first guide grooves 21c, and backward first guide grooves 21d are formed in both side surfaces in the X-axis direction so as to extend in the Y-axis direction, as illustrated in FIGS. 6 and 9. The shutter unit 70 is disposed in the opening forming member 21 so that the forward guided axis 71a fits into the forward first guide groove 21b, the intermediate guided axis 73a fits into the intermediate first guide groove 21c, and the backward guided axis 73b fits into the backward first guide groove 21d.

The forward guided axis 71a, intermediate guided axis 73a, and backward guided axis 73b may be collectively referred to below as the guided axes (71a, 73a, and 73b).

Similarly, the forward first guide groove 21b, intermediate first guide groove 21c, and backward first guide groove 21d may be collectively referred to below as the first guide grooves (21b, 21c, and 21d).

In this structure, the shutter unit 70 is guided between the closed position and the open position by the opening forming member 21.

Figure 11A:
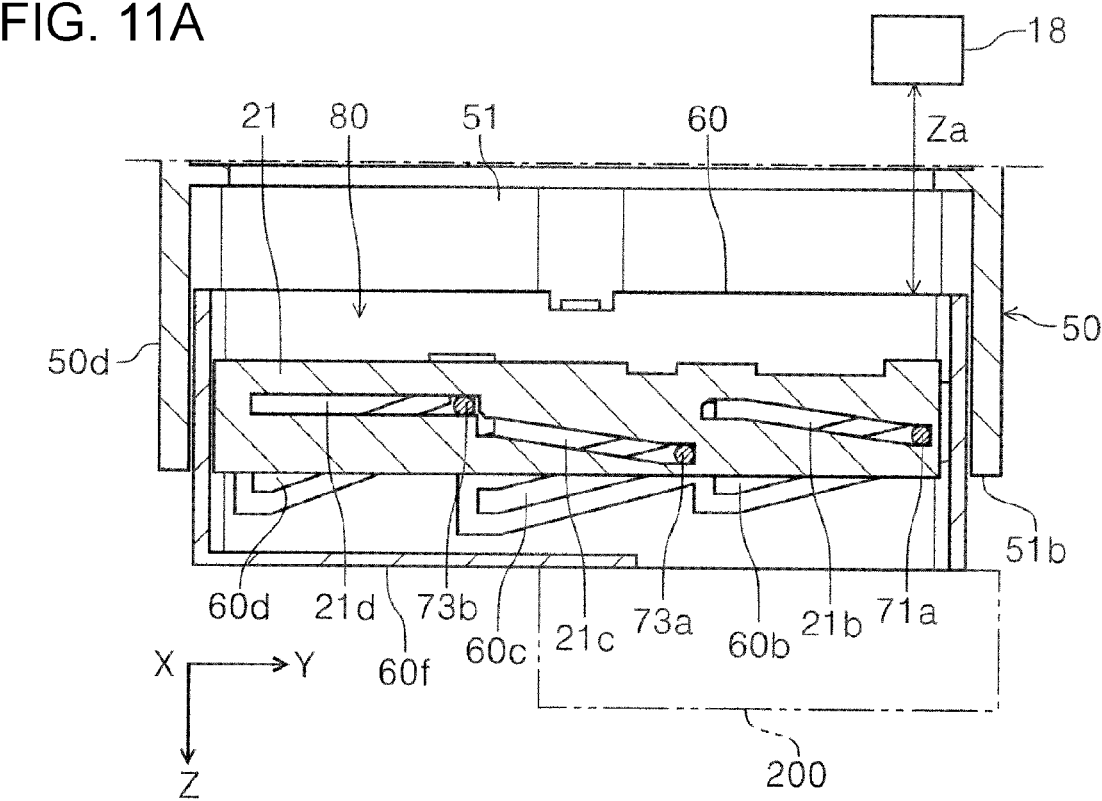
FIGS. 11A and 11B illustrate a state in which the shifting member is at a reference value acquiring position, at which the shifting member is slightly distant from the projection position, and the shutter unit is at the closed position.
Figure 12A:
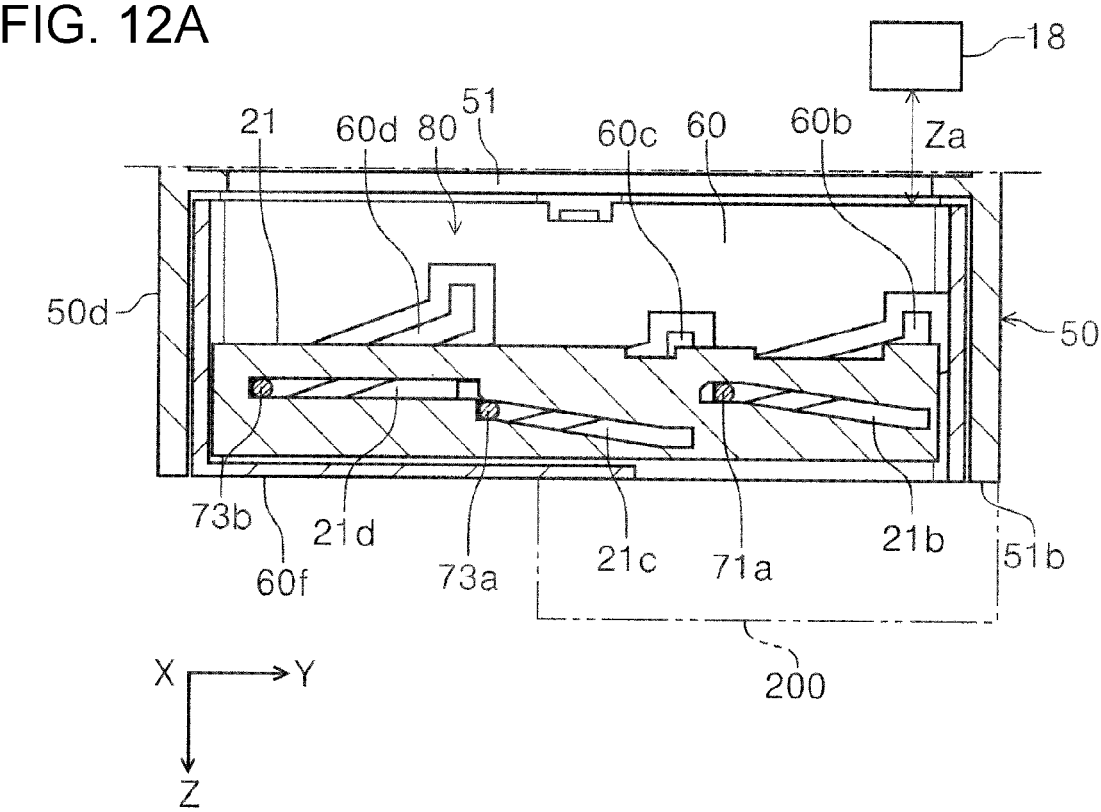
FIGS. 12A and 12B illustrate a state in which the shifting member is at the projection position and the shutter unit is at the open position.

The forward first guide groove 21b and intermediate first guide groove 21c are formed so as to be upwardly inclined from the end in the +Y direction toward the −Y direction, as illustrated in FIGS. 11A and 12A. The backward first guide groove 21d horizontally extends.

The reason why the forward first guide groove 21b and intermediate first guide groove 21c are formed so as to be upwardly inclined from the end in the +Y direction toward the −Y direction is that when the shutter unit 70 moves to the open position, the shutter holding member 71 and shutter member 72 retract in the +Z direction.

Figure 8:
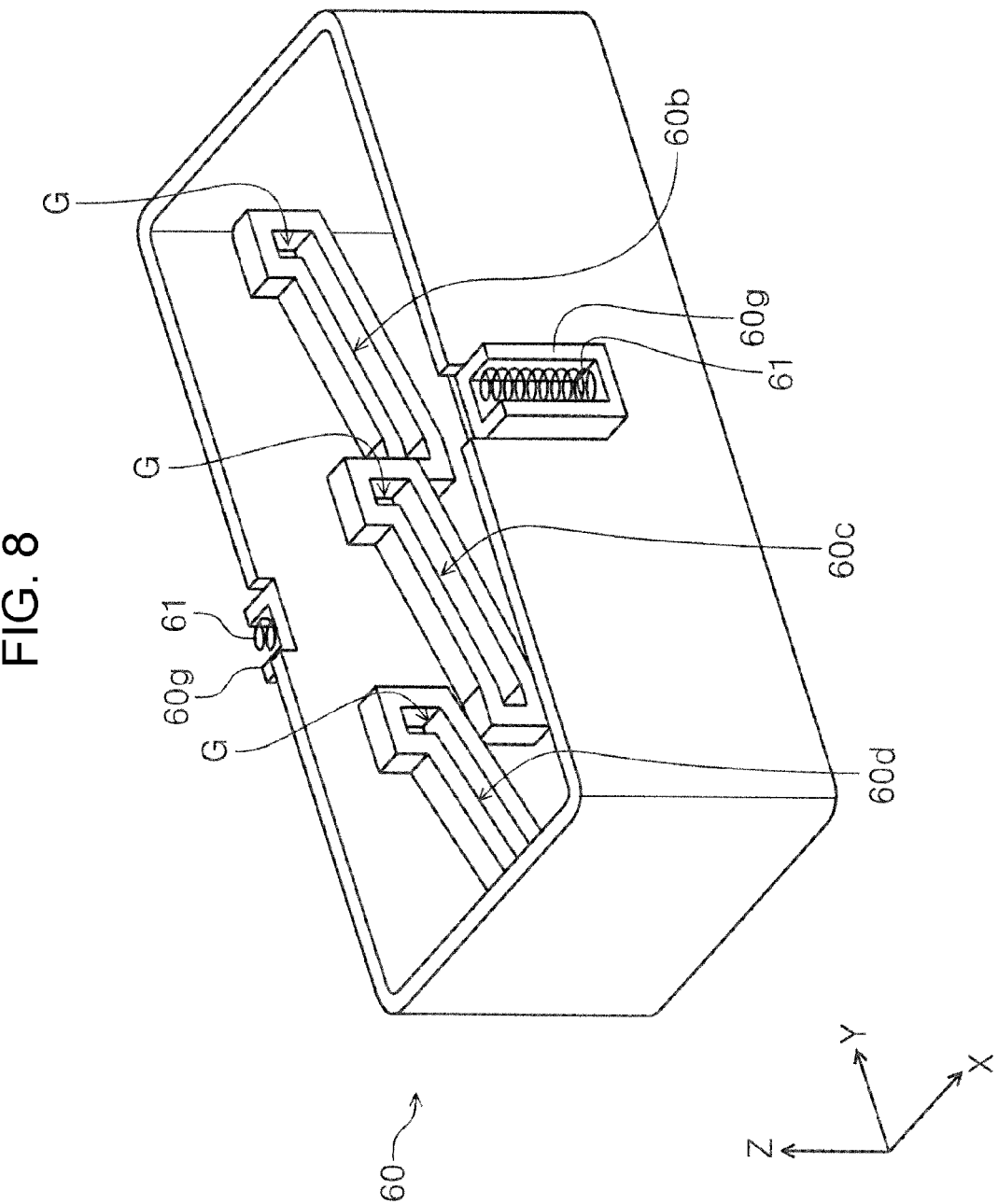
FIG. 8 is a perspective view of the shifting member when viewed from above.

Inside the shifting member 60, forward second guide grooves 60b, intermediate second guide groove 60c, and backward second guide grooves 60d are formed in both side surfaces in the X-axis direction so as to extend in the Y-axis direction, as illustrated in FIG. 8. In FIG. 8, only the forward second guide groove 60b, intermediate second guide groove 60c, and backward second guide groove 60d formed in the side surface in the −X direction appears, and the forward second guide groove 60b, intermediate second guide groove 60c, and backward second guide groove 60d formed in the side surface in the +X direction are at hidden positions.

Figure 11B:
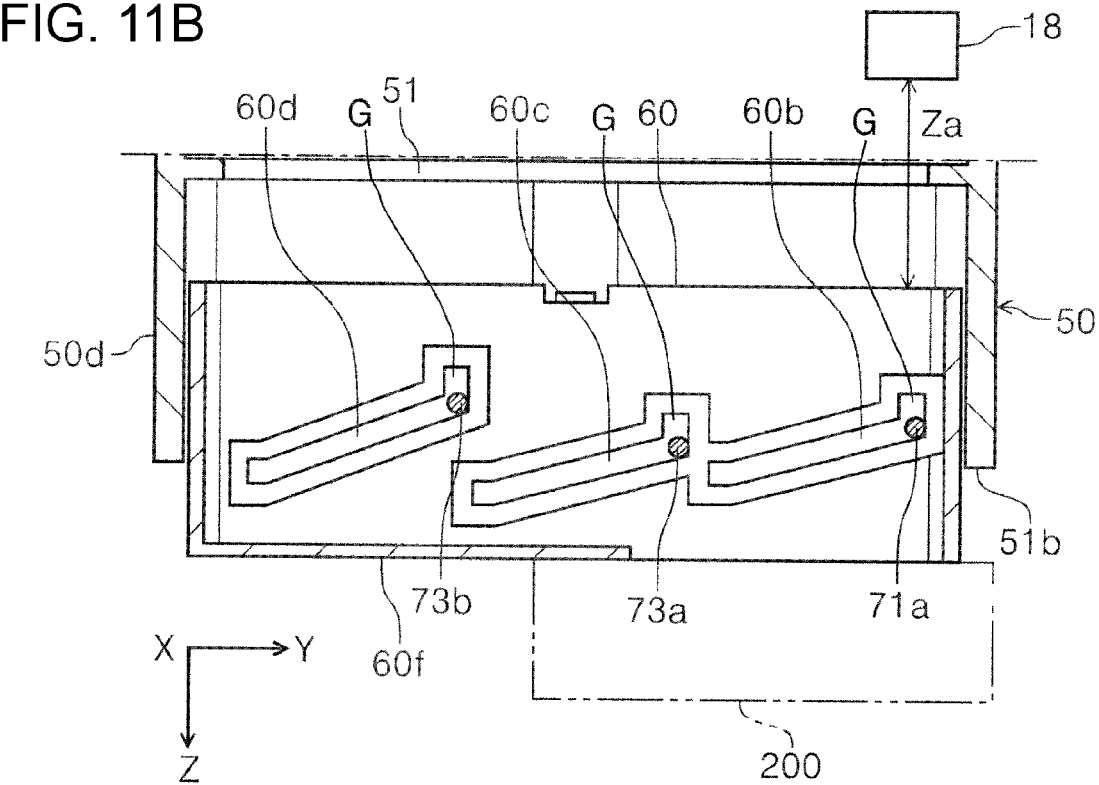
Figure 12B:
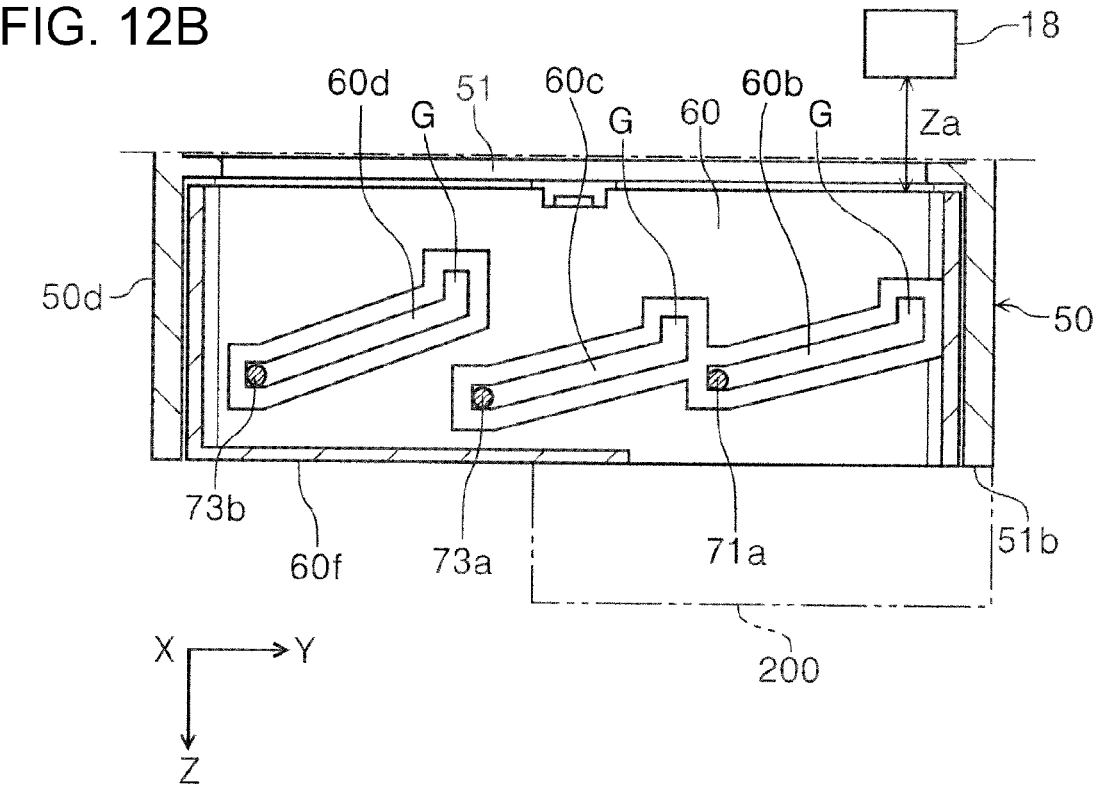

The forward second guide groove 60b, intermediate second guide groove 60c, and backward second guide groove 60d are formed so as to be downwardly inclined as a whole from the end in the +Y direction toward the −Y direction, as illustrated in FIGS. 11B and 12B. In the end in the +Y direction, however, they are shaped so as to straightly extend along the Z-axis direction within a predetermined range indicated by the letter G.

The forward second guide groove 60b, intermediate second guide groove 60c, and backward second guide groove 60d may be collectively referred to below as the second guide grooves (60b, 60c, and 60d).

The shutter unit 70 is disposed so that the forward guided axis 71a fits into the forward second guide groove 60b, the intermediate guided axis 73a fits into the intermediate second guide groove 60c, and the backward guided axis 73b fits into the backward second guide groove 60d.

When the shifting member 60 and opening forming member 21 each are formed in a two-part structure so as to sandwich the shutter unit 70 from both sides in the X-axis direction, ease of assembling is enhanced. Alternatively, the guided axes (71a, 73a, and 73b) may be provided so that they can advance and retract in the X-axis direction and may be structured so as to be pressed in the projection direction by a pressing member such as spring.

The shifting member 60 is provided so that it can shift in the Z-axis direction with respect to the main case 51. The shifting member 60 is pressed in the −Z direction, that is, the direction in which the shifting member 60 projects from the bottom surface 51b, by a helical compression spring 61 (see FIGS. 6 and 8), which is an example of a first pressing member.

Figure 3:
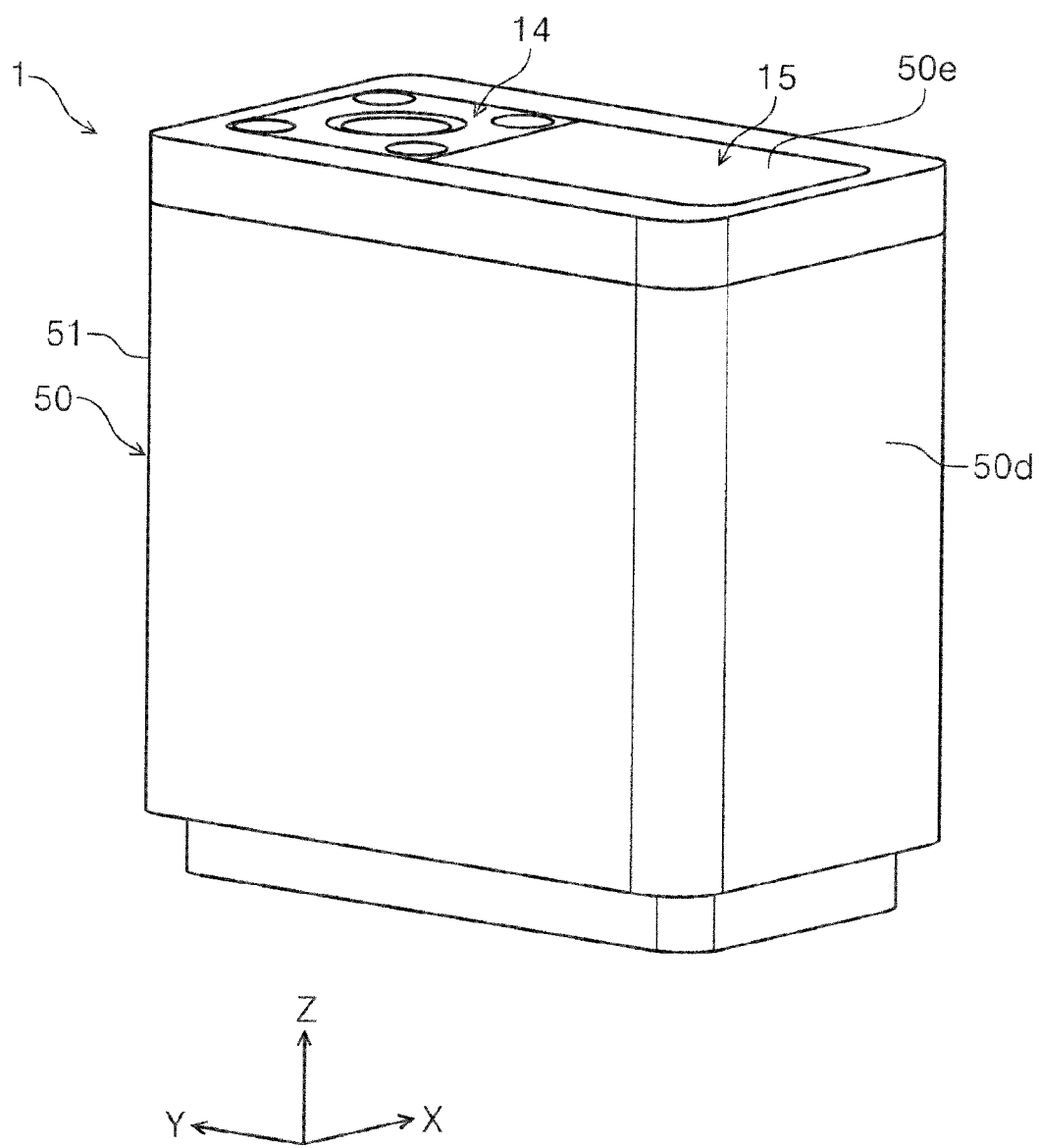
FIG. 3 is a perspective view of the colorimetric apparatus when viewed from above.

Therefore, when the apparatus body 50 is pressed in the down direction with the shifting member 60 facing below as illustrated in FIG. 3, the shifting member 60 shifts in the +Z direction relative to the main case 51. As a result, the bottom surface 51b and the bottom surface of the wall 60f become flush with each other, as indicated by a change from FIGS. 10A and 10B to FIGS. 12A and 12B.

As described above, when the apparatus body 50 is pressed in the down direction with the shifting member 60 facing below as illustrated in FIG. 3, the shifting member 60 shifts in the +Z direction relative to the main case 51. In this case, the shifting member 60 does not shift with respect to the object 200 under measurement, but the apparatus body 50 shifts with respect to the object 200 under measurement. For convenience of explanation, however, it will be assumed in some cases in the description below that the shifting member 60 shifts.

The shift of the shifting member 60 and the shift of the shutter unit 70 will be described below with reference to FIGS. 10A and 10B, FIGS. 11A and 11B, and FIGS. 12A and 12B.

Figure 10A:
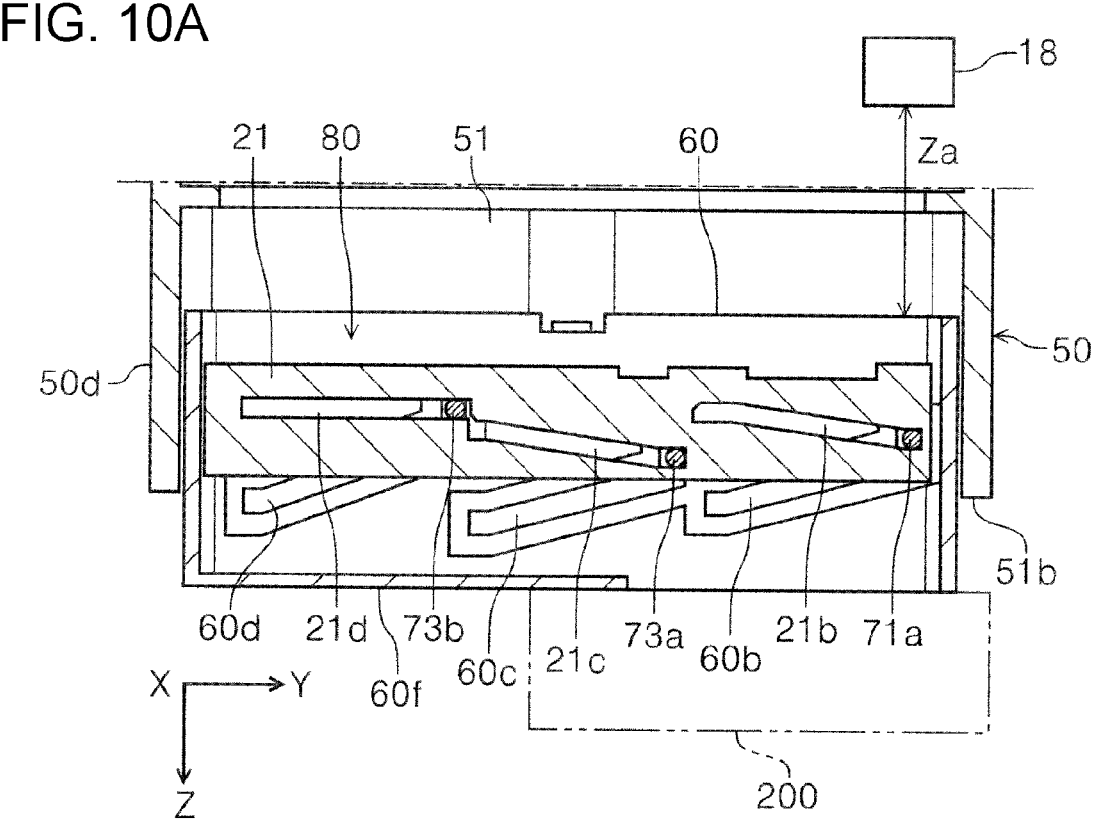
FIGS. 10A and 10B illustrate a state in which the shifting member is at the projection position and the shutter unit is at the closed position.
Figure 10B:
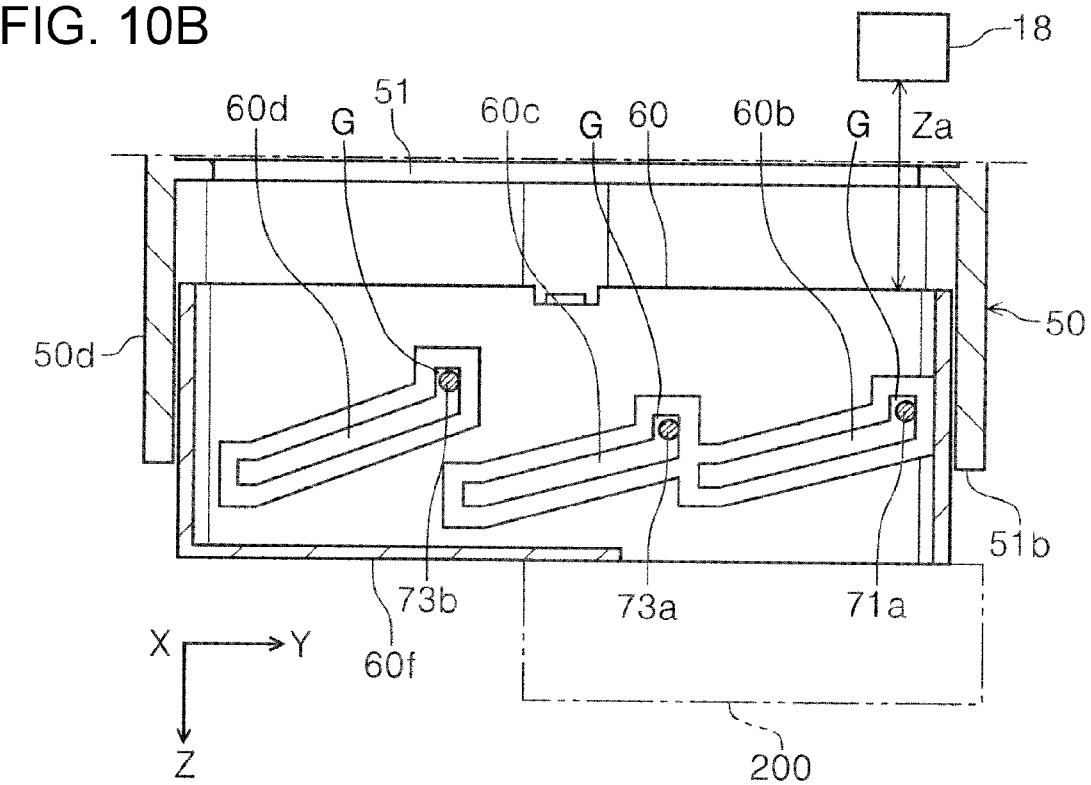

In the state in FIGS. 10A and 10B, the shifting member 60 is in a projection position, at which the shifting member 60 projects the most in the +Z direction, and the shutter unit 70 is at the closed position. In this state, the guided axes (71a, 73a, and 73b) are positioned at the ends of the first guide grooves (21b, 21c, and 21d) in the +Y direction.

Also in this state, the guided axes (71a, 73a, and 73b) are positioned at the ends of the second guide grooves (60b, 60c, and 60d) in the +Y direction and at their ends in the +Z direction.

When, in this state, the apparatus body 50 is pressed in the down direction, the shifting member 60 shifts relative to the apparatus body 50 in the +Z direction, as indicated by a change from FIGS. 10A and 10B to FIGS. 11A and 11B. In the change from FIGS. 10A and 10B to FIGS. 11A and 11B, the guided axes (71a, 73a, and 73b) slightly move in the down direction while remaining at the ends of the second guide grooves (60b, 60c, and 60d) in the +Y direction. In this state, the guided axes (71a, 73a, and 73b) are outside the inclined areas of the second guide grooves (60b, 60c, and 60d) and thereby do not move in the −Y direction. That is, the shutter unit 70 remains at the closed position.

When the apparatus body 50 is further pressed in the down direction in the state in FIGS. 11A and 11B, the shifting member 60 further shifts relative to the apparatus body 50 in the +Z direction, as indicated by a change from FIGS. 11A and 11B to FIGS. 12A and 12B. As a result, the bottom surface of the wall 60f and the bottom surface 51b from become flush with each other. The position of the shifting member 60 in this state is a retraction position.

In this process, the guided axes (71a, 73a, and 73b) are guided in the −Y direction by being affected by the inclined areas of the second guide grooves (60b, 60c, and 60d). Thus, the guided axes (71a, 73a, and 73b) move to the ends of the first guide grooves (21b, 21c, and 21d) in −Y direction. That is, the shutter unit 70 moves to the open position.

When, in the state in FIGS. 12A and 12B, the user releases the hand from the apparatus body 50 or weakens the force with which the apparatus body 50 is pressed in the down direction, the shifting member 60 returns to the projection position indicated in FIGS. 10A and 10B due to the pressing force of the helical compression spring 61 (see FIGS. 5 and 8). Along with this, the shutter unit 70 returns to the closed position.

It is preferable to further provide a pressing member (for example, a helical compression spring) that presses the shutter unit 70 toward the closed position. This enables the shutter unit 70 to more reliably return to the closed position.

As described above, the guided axes (71a, 73a, and 73b) provided in the shutter unit 70, the first guide grooves (21b, 21c, and 21d) provided in the opening forming member 21, and the second guide grooves (60b, 60c, and 60d) provided in the shifting member 60 constitute an operation conversion means 80 that converts the shift operation of the shifting member 60 with respect to the apparatus body 50 to the shift operation of the shutter unit 70.

In this embodiment, the guided axes (71a, 73a, and 73b) project in the X-axis direction crossing the Y-axis direction, in which the shutter unit 70 shifts. The first guide grooves (21b, 21c, and 21d), into which the guided axes (71a, 73a, and 73b) fit, guide the shutter unit 70 between the closed position and the open position. The second guide grooves (60b, 60c, and 60d), into which the guided axes (71a, 73a, and 73b) fit, extend in a direction crossing the Z-axis direction, in which the shifting member 60 shifts. Along with the shift with respect to the apparatus body 50, the second guide grooves (60b, 60c, and 60d) move the guided axes (71a, 73a, and 73b) in the first guide grooves (21b, 21c, and 21d).

In this structure, the operation conversion means 80 can be implemented with a few number of parts.

As described above, the apparatus body 50 has: the shifting member 60 that can shift between the projection position, at which the shifting member 60 projects the most in the first direction (+Z direction), and the retraction position, at which the shifting member 60 retracts the most in the second direction (−Z direction); the helical compression spring 61 used as the first pressing member that presses the shifting member 60 in the +Z direction; and the operation conversion means 80 that converts the shift operation of the shifting member 60 with respect to the apparatus body 50 to the shift operation of the shutter unit 70. Thus, in a state in which the shifting member 60 is at the projection position, the shutter unit 70 is at the closed position. When the shifting member 60 shifts from the projection position to the retraction position, the shutter unit 70 shifts from the closed position to the open position. This simplifies the user's manipulation to perform colorimetry, so the usability of the colorimetric apparatus 1 can be improved.

In the state in FIGS. 10A and 10B, the measurement portion of the object 200 under measurement is positioned inside the shifting member 60. In this embodiment, therefore, to improve the visibility of the measurement portion, the shifting member 60 is formed from a transparent material so that the measurement portion of the object 200 under measurement can be viewed from the outside in a state in which the opening 21a (see FIG. 6) faces the object 200 under measurement. This eases the alignment of the colorimetry portion, so the usability of the colorimetric apparatus 1 is improved.

In this case, it is also preferable to provide a light source that emits visible light toward the object 200 under measurement. This further eases the alignment of the colorimetry portion. Instead of providing a special light source, the light emitter 9 (see FIG. 1) for use in colorimetry may be used as the light source.

The shifting member 60 is not limited to a transparent material. The shifting member 60 may be formed from a non-transparent material. In this case, it is further preferable to attach a mark or the like for alignment in measurement to the outer side of the shifting member 60.

Next, processing executed by the MCU 10 (see FIG. 1) used as a controller will be described with reference to FIG. 13.

The apparatus body 50 has the range sensor 18 that detects the distance Za (see FIGS. 10A and 10B, FIGS. 11A and 11B, and FIGS. 12A and 12B) from the shifting member 60.

Figure 13:
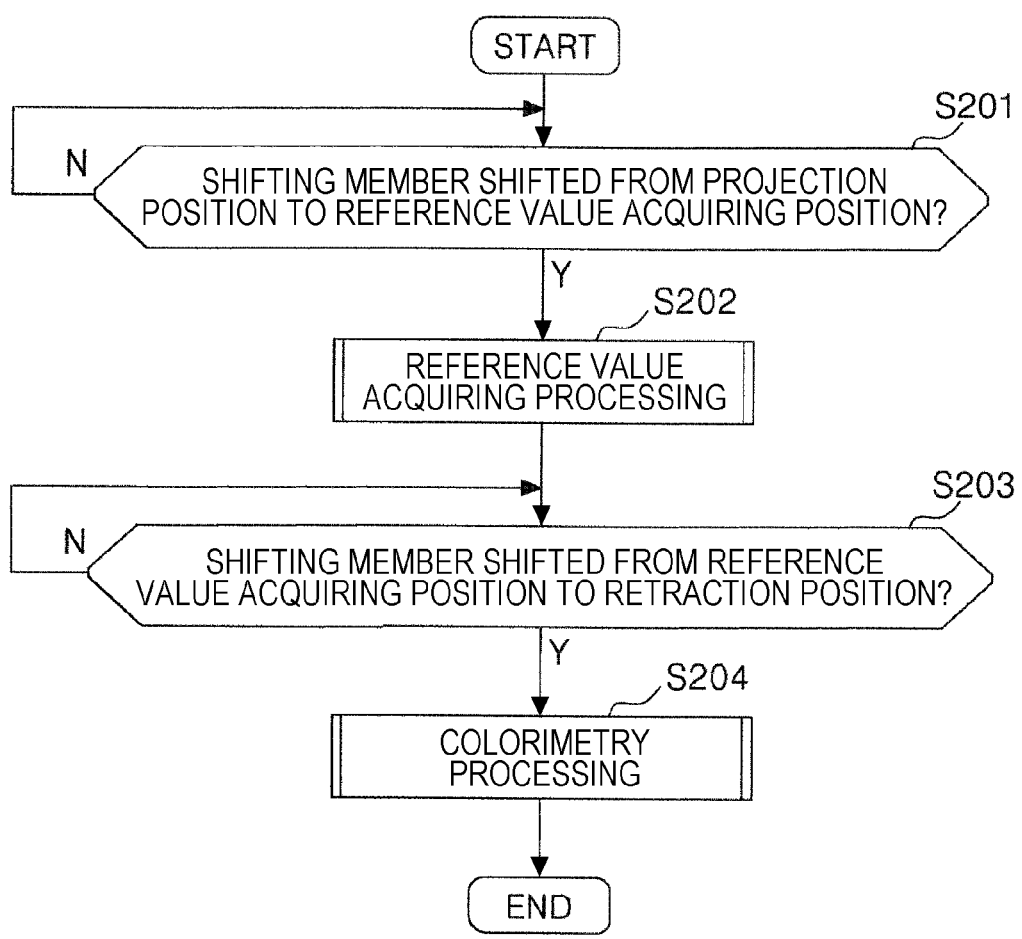
FIG. 13 is a flowchart illustrating processing executed by a controller in response to a shift of the shifting member.

The MCU 10 performs processing illustrated in FIG. 13 according to detection information obtained from the range sensor 18.

First, the MCU 10 detects, from the detection information obtained from the range sensor 18, that the shifting member 60 has shifted from the projection position to a reference value acquiring position (Yes in step S201), the MCU 10 performs reference value acquiring processing (step S202).

The reference value acquiring position is the position of the shifting member 60 illustrated in FIGS. 11A and 11B, specifically the position of the shifting member 60 when the shifting member 60 has shifted from the projection position toward the retraction position but the shutter unit 70 remains at the closed position.

In this state, the MCU 10 performs reference value acquiring processing in which the white plate, which functions as the reflection reference surface, is used to acquire the reflection reference value (step S202).

Next, when the MCU 10 detects, from the detection information obtained from the range sensor 18, that the shifting member 60 has moved from the reference value acquiring position to the retraction position, that is, the shutter unit 70 has moved to the open position (Yes in step S203), the MCU 10 performs colorimetry processing (step S204).

As described above, the colorimetric apparatus 1 has: the range sensor 18, which is an example of a detector that detects information about the position of the shifting member 60; the white plate, which is an example of the reflection reference surface; and the MCU 10, which is an example of a controller that can execute reference value acquiring processing for acquiring the reflection reference value. Since the MCU 10 executes reference value acquiring processing when the MCU 10 detects, from detection information obtained from the range sensor 18, a shift of the shifting member 60 from the projection position toward the retraction position, the user itself does not need to command execution of the reference value acquiring processing. This improves the usability of the colorimetric apparatus 1.

Reference value acquiring processing is preferably executed in a state in which the shifting member 60 has started to move from the projection position toward the retraction position and then the shutter unit 70 is completely at the closed position.

Since the MCU 10 executes colorimetry processing when the MCU 10 detects, from the detection information obtained from the range sensor 18, that the shifting member 60 has moved to the retraction position, the user itself does not need to command execution of the colorimetry processing. This improves the usability of the colorimetric apparatus 1.

In this embodiment, the detector that detects information about the position of the shifting member 60 has been structured as the range sensor 18. However, this is not a limitation. Any device that can detect the position of the shifting member 60 can be used. An example that can be used as the detector is a sensor or switch that is turned on or off when the shifting member 60 has moved to the reference value acquiring position or retraction position.

Alternatively, a detector that detects that the shutter unit 70 has moved to the open position may be provided, instead of the detector that detects that the shifting member 60 has moved to the retraction position. Then, colorimetry processing (step S204) may be executed according to detection information obtained from the alternative detector.

In this embodiment, both reference value acquiring processing and colorimetry processing have been executed in response to a shift of the shifting member 60. However, colorimetry processing may be executed without executing reference value acquiring processing. In addition, an arrangement may be made so that the user can make a setting about whether to perform reference value acquiring processing in response to a shift of the shifting member 60.

In this embodiment, the shift of the shifting member 60 has been converted to the operation of the shutter unit 70 without using the power of a motor or the like. However, it is also possible to use the power of a motor or the like to convert the shift of the shifting member 60 to the operation of the shutter unit 70. For example, a detector may be provided that detects that the shifting member 60 has moved from the reference value acquiring position to a predetermined position short of the retraction position. Then, by using the power of a motor or the like, the shutter unit 70 may be shifted to the open position according to detection information obtained from the detector.

The present disclosure is not limited to the embodiment described above. Various variations are possible without departing from the intended scope of the present disclosure described in the claims. It will be understood that these variations are also included in the range of the present disclosure.

For example, although the battery 17 in the colorimetric apparatus 1 in the embodiment described above is of built-in type, the colorimetric apparatus 1 may be structured so that the battery 17 is removable. That is, the colorimetric apparatus 1 may be structured so that the battery 17 is not built into the colorimetric apparatus 1. In this case, the battery 17 may be a primary battery, which is not intended for repeated charging and discharging.

The incident light processor 2 in this embodiment has the optical filter 3 and light receiver 4, the optical filter 3 being a tunable Fabry-Perot etalon that transmits light with a predetermined wavelength, the light being part of incident light. However, this is not a limitation. For example, spectroscopy using a diffraction grating may be used as spectroscopy. In addition, the colorimetric apparatus 1 may use, as a colorimetric principle, photoelectric tristimulus colorimetry in which tristimulus values, which represent a hue, are directly measured.

The light-emitting element used in the light emitter 9 in this embodiment is an LED. However, this is not a limitation. For example, a xenon lamp may be used as the light-emitting element.

What is claimed is:

1. A colorimetric apparatus comprising:
    an apparatus body;
    an opening forming member in which an opening through which light received from an object under measurement is taken into an interior of the apparatus body is formed, the opening forming member being disposed at a bottom of the apparatus body;
    an incident light processor that processes light incident through the opening; and
    a shutter configured to shift between a closed position, at which the shutter covers the opening, and an open position, at which the shutter opens the opening, colorimetry being performed with the shutter at the open position, wherein
    the apparatus body has
        a shifting member that is shaped along an inner surface of the apparatus body so as to enclose the opening forming member, wherein the shifting member is configured to shift between a projection position, at which the shifting member projects the most in a first direction in which the shifting member projects from the bottom, and a retraction position, at which the shifting member retracts the most in a second direction opposite to the first direction, a first spring that presses the shifting member in the first direction, and an operation conversion unit that has a second guide groove formed in the shifting member, wherein the operation conversion unit converts a shift operation of the shifting member with respect to the apparatus body to a shift operation of the shutter, in a state in which the shifting member is at the projection position, the shutter is at the closed position, and when the shifting member shifts from the projection position to the retraction position, the shutter is shifted from the closed position to the open position by the operation conversion unit.

2. The colorimetric apparatus according to claim 1, further comprising a case that forms a side surface of the apparatus body, wherein the shifting member is shaped along an inner surface of the case so as to enclose the opening forming member.

3. The colorimetric apparatus according to claim 2, wherein the shifting member has a wall that covers part of the opening forming member, and a window through which the opening is exposed.

4. The colorimetric apparatus according to claim 2, wherein the operation conversion unit has a guided axis disposed in the shutter, and a first guide groove formed in the opening forming member, the guided axis projects in a direction crossing a direction in which the shutter shifts, the first guide groove, into which the guided axis fits, guides the shutter between the closed position and the open position, and the second guide groove, into which the guided axis fits, extends in a direction crossing a direction in which the shifting member shifts, the second guide groove moving the guided axis in the first guide groove along with a shift with respect to the apparatus body.

5. The colorimetric apparatus according to claim 2, wherein the shifting member is formed from a transparent material so that the object under measurement is visible from an outside in a state in which the opening faces the object under measurement.

6. The colorimetric apparatus according to claim 1, wherein the shutter has a shutter member that closes the opening when the shutter is at the closed position, a shutter holding member that holds the shutter member so that the shutter member shifts in a direction toward the opening and in a direction away from the opening, and a second spring that presses the shutter member toward the opening.

7. The colorimetric apparatus according to claim 1, further comprising:

a reflection reference surface provided at a position, in the shutter, at which the reflection reference surface faces the opening;

a detector that detects information about a position of the shifting member; and a controller configured to execute reference value acquiring processing in which a reflection reference value is acquired by using the reflection reference surface, wherein the controller executes the reference value acquiring processing when the controller detects, from detection information obtained from the detector, the shift of the shifting member from the projection position toward the retraction position.

8. The colorimetric apparatus according to claim 7, wherein the controller executes colorimetry processing when the controller detects, from the detection information obtained from the detector, that the shifting member moved to the retraction position.

9. The colorimetric apparatus according to claim 1, further comprising a detector that detects information about a position of the shifting member, wherein a controller responsible for execution of colorimetry processing executes the colorimetry processing when the controller detects, from detection information obtained from the detector, that the shifting member moved to the retraction position.

* * * * *